(12) United States Patent
Li et al.

(10) Patent No.: US 10,763,487 B2
(45) Date of Patent: Sep. 1, 2020

(54) POWER BATTERY CAP STRUCTURE AND POWER BATTERY

(71) Applicant: CONTEMPORARY AMPEREX TECHNOLOGY CO., LIMITED, Ningde (CN)

(72) Inventors: Quankun Li, Ningde (CN); Kai Wu, Ningde (CN); Pinghua Deng, Ningde (CN); Xiaobo Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 15/586,051

(22) Filed: May 3, 2017

(65) Prior Publication Data

US 2017/0237059 A1    Aug. 17, 2017

Related U.S. Application Data

(63) Continuation-in-part of application No. 14/842,742, filed on Sep. 1, 2015, now Pat. No. 9,929,396.

(30) Foreign Application Priority Data

Jul. 23, 2015   (CN) .......................... 2015 1 0438316

(51) Int. Cl.
   *H01M 2/34* (2006.01)
   *H01M 2/04* (2006.01)
   *H01M 2/30* (2006.01)

(52) U.S. Cl.
   CPC .......... *H01M 2/345* (2013.01); *H01M 2/043* (2013.01); *H01M 2/305* (2013.01);
   (Continued)

(58) Field of Classification Search
   CPC .................................................... H01M 2/345
   See application file for complete search history.

(56) References Cited

U.S. PATENT DOCUMENTS

| 2008/0038628 A1 | 2/2008 | Yamauchi et al. |
| 2012/0141845 A1 | 6/2012 | Byun et al. |

(Continued)

FOREIGN PATENT DOCUMENTS

| CN | 103050646 A | 4/2013 |
| CN | 203150627 U | 8/2013 |

(Continued)

OTHER PUBLICATIONS

Third Office Action for Japanese Application No. 2015-170301 dated Jul. 18, 2017, with machine English translation provided by foreign associate.

(Continued)

*Primary Examiner* — James Lee
(74) *Attorney, Agent, or Firm* — Ladas & Parry, LLP (57) ABSTRACT

A power battery cap structure and a power battery are provided. The power battery cap structure includes a first terminal, a second terminal and a cap assembly; the second terminal is electrically insulated from the cap assembly. The power battery cap structure further includes a resistance which electrically connects the first terminal with the cap assembly. The cap assembly includes a cap sheet, a first short circuit part and a second short circuit part; the first and second short circuit part are attached to the cap sheet, when internal pressure of the power battery exceeds predetermined threshold, the first and second short circuit part act and form a first path passing through the first terminal, the second short circuit part, the resistance and the second (Continued)

terminal, and a second path passing through the first terminal, the first and second short circuit part and the second terminal.

14 Claims, 4 Drawing Sheets

(52) U.S. Cl.
 CPC .... *H01M 2200/20* (2013.01); *H01M 2220/10* (2013.01); *H01M 2220/20* (2013.01)

(56) References Cited

U.S. PATENT DOCUMENTS

| | | | |
|---|---|---|---|
| 2013/0029191 A1 | 1/2013 | Byun et al. | |
| 2013/0130072 A1* | 5/2013 | Guen | H01M 2/043 429/61 |
| 2013/0273401 A1* | 10/2013 | Lee | H01M 2/08 429/82 |
| 2015/0044528 A1 | 2/2015 | Yang et al. | |
| 2015/0132619 A1 | 5/2015 | He et al. | |

FOREIGN PATENT DOCUMENTS

| | | |
|---|---|---|
| CN | 204333054 U | 5/2015 |
| CN | 204809275 U | 11/2015 |
| EP | 2461393 A1 | 6/2012 |
| JP | 2008066255 A | 3/2008 |
| JP | 2011-124214 A | 6/2011 |
| JP | 2012119303 A | 6/2012 |
| JP | 2013-058475 A | 3/2013 |
| JP | 2014-082073 A | 5/2014 |
| JP | 2014-82073 A | 5/2014 |
| JP | 2015095462 A | 5/2017 |

OTHER PUBLICATIONS

Extended European Search Report and Opinion for European Patent application No. 17168297 dated Aug. 28, 2017.
From Japanese Patent Application No. 2015-170301, Notice of Refusal, dated Aug. 2, 2016, and its English translation from Google Translate.
From CN20150438316.3, First Office Action, dated Dec. 30, 2016, and its English translation from SIPO.
From JP2015-170301, Notification of Reasons for Refusal, dated Mar. 7, 2017, and its English translation from JPO.
From EP15183087, European Search Report, dated Dec. 14, 2016.

* cited by examiner

POWER BATTERY CAP STRUCTURE AND POWER BATTERY

CROSS-REFERENCE TO RELATED APPLICATIONS

The present application is a continuation-in-part of U.S. application Ser. No. 14/842,742, filed on Sep. 1, 2015, which claims priority to Chinese Patent Application No. 201510438316.3, filed on Jul. 23, 2015, the contents of both of which are incorporated herein by reference in their entireties.

TECHNICAL FIELD

The present invention relates to the technical field of power battery, and particularly to a power battery cap structure and a power battery.

BACKGROUND

Electric vehicles and energy storage power stations and the like generally require power batteries with a high capacity as power supplies. These power batteries should have, in addition to a high capacity, good security and a long cycle life to meet the standards for employment and people's needs.

In the prior art, when a power battery is overcharged, decomposition of the electrolyte in the power battery will generate excessive heat inside the power battery, thus causing the battery to fire; or it will cause the pressure inside power battery to increase, thus resulting in explosion of the battery. Therefore, before the power battery is out of control, it needs to cut off a connecting part of a positive tab and a positive terminal with the aid of an external short circuit structure to prevent the power battery from being continually charged. Under normal circumstances, in a power battery cap structure, there is a resistance provided between a positive terminal and a cap sheet so that the positive terminal is electrically connected with the cap sheet through the resistance, while a short circuit part is provided near a negative terminal, and the short circuit part acts upwards when the pressure inside the power battery increases so that a loop is formed between the negative and positive of the power battery, and a great current is generated in the loop to melt off the connecting part so as to cut off the main loop. In order to satisfy the current for melting off the connecting part, it is required that the resistance value of the resistance between the positive and cap sheet of the power battery be small. However, in the case of nailing abuse of a power battery, if the resistance value of the resistance between the positive and cap sheet of the power battery is small, the current of the external short circuit will be too large, and the nailing situation will spark, which will ignite the electrolyte and cause the battery to catch fire. Therefore, in the case of nailing abuse, the resistance value of the resistance between the positive and cap sheet of the power battery is required to be very large.

Based on the above mentioned, the requirements for the resistance value between the positive and cap sheet of a power battery in the cases such as overcharge or nailing abuse are contradictory in the prior art, and thus the protection for both overcharge and nailing abuse of the power battery cannot be satisfied simultaneously regardless of either the value of resistance of the cap structure of the power battery is large or small.

SUMMARY

The present invention provides a power battery cap structure and a power battery to solve the problem in the prior art that the protection for overcharge and nailing abuse of a power battery cannot be satisfied simultaneously.

The present invention provides a power battery cap structure, comprising a first terminal, a second terminal and a cap assembly, the second terminal being electrically insulated from the cap assembly; the power battery cap structure further comprises a resistance which electrically connects the first terminal with the cap assembly, the cap assembly comprises a cap sheet, a first short circuit part and a second short circuit part;

the first short circuit part and the second short circuit part are attached to the cap sheet, when an internal pressure of the power battery exceeds a predetermined threshold, the first short circuit part and the second short circuit part act and then form a first path and a second path between the first terminal and the second terminal; the first path passes through the first terminal, the second short circuit part, the resistance and the second terminal; and the second path passes through the first terminal, the first short circuit part, the second short circuit part and the second terminal.

Preferably, a resistance value of the resistance is larger than a resistance value of the first short circuit part.

Preferably, the first path comprises the first terminal, the resistance, the cap sheet, the second short circuit part and the second terminal which are in series; the second path comprises the first terminal, the first short circuit part, the cap sheet, the second short circuit part and the second terminal which are in series.

Preferably, the first path comprises the first terminal, the resistance, the cap sheet, the second short circuit part and the second terminal which are in series successively; the second path comprises the first terminal, the first short circuit part, the cap sheet, the second short circuit part and the second terminal which are in series successively.

Preferably, further comprising a first terminal conductive lump, the first terminal conductive lump is electrically connected with the first terminal, the resistance is arranged between the first terminal conductive lump and the cap sheet;

the first path comprises the first terminal, the first terminal conductive lump, the resistance, the cap sheet, the second short circuit part and the second terminal which are in series; the second path comprises the first terminal, the first terminal conductive lump, the first short circuit part, the cap sheet, the second short circuit part and the second terminal which are in series.

Preferably, the first path comprises the first terminal, the first terminal conductive lump, the resistance, the cap sheet, the second short circuit part and the second terminal which are in series successively; the second path comprises the first terminal, the first terminal conductive lump, the first short circuit part, the cap sheet, the second short circuit part and the second terminal which are in series successively.

Preferably, the power battery cap structure further comprises a first terminal conductive lump, the first terminal conductive lump is electrically connected with the first terminal, the resistance is arranged between the first terminal conductive lump and the cap sheet;

the power battery cap structure further comprises a second terminal conductive lump, the second terminal conductive lump is electrically connected with the second terminal;

the first short circuit part is electrically connected with the cap sheet, and in a normal state, the first short circuit part is insulated from the first terminal conductive lump; when the internal pressure of the power battery exceeds the predetermined threshold, the first short circuit part acts to be electrically connected with the first terminal conductive lump;

the second short circuit part is electrically connected with the cap sheet, and in a normal state, the second short circuit part is insulated from the second terminal conductive lump; when the internal pressure of the power battery exceeds the predetermined threshold, the second short circuit part acts to be electrically connected with the second terminal conductive lump.

Preferably, the cap sheet is provided with a second through hole, the second through hole is provided below the second terminal conductive lump, the second short circuit part is arranged below the second through hole; when the internal pressure of the power battery exceeds the predetermined threshold, the second short circuit part acts upward, and the second short circuit part goes through the second through hole so as to be electrically connected with the second terminal conductive lump.

Preferably, the cap sheet is provided with a first through hole, the first through hole is provided below the first terminal conductive lump, the first short circuit part is arranged below the first through hole; when the internal pressure of the power battery exceeds the predetermined threshold, the first short circuit part acts upward, and the first short circuit part goes through the first through hole so as to be electrically connected with the first terminal conductive lump.

Preferably, both the first short circuit part and the second short circuit part adopt a deformable sheet, the deformable sheet comprises: a soldering part, a protrusion part and a connecting part located between the soldering part and the protrusion part, the protrusion part being provided at a center position of the deformable sheet, and the soldering part being provided on an outer periphery of the connecting part; the soldering part is electrically connected with the cap sheet, when the internal pressure of the power battery exceeds the predetermined threshold, the deformable sheet acts so that the first terminal and the second terminal are electrically connected.

Preferably, a thickness of the connecting part gradually decreases in a direction from the protrusion part to the soldering part.

Preferably, the protrusion is shaped as a cylinder.

Preferably, both the first short circuit part and the second short circuit part adopt a deformable sheet, the deformable sheet is configured to be bent to project away from the cap assembly; the periphery of the deformable sheet is electrically connected with the cap sheet, when the internal pressure of the power battery exceeds the predetermined threshold, the deformable sheet acts so that the first terminal and the second terminal are electrically connected.

The present invention further provides a power battery, the cap structure of which uses any one of the power battery cap structure as described.

Preferably, the power battery comprises a first electrode tab and a connecting part for electrically connecting the first electrode tab with the first terminal, and a aperture provided on the connecting part.

In the power battery cap structure and power battery according to the present invention, a first short circuit part and a second short circuit part are provided respectively at the side of a first terminal and the side of a second terminal of a cap sheet, a resistance is provided between the first terminal and the cap sheet. Under the circumstance of nailing abuse of a power battery, since no gas is generated inside the battery, the first short circuit part and the second short circuit part do not function, the first terminal and the second terminal of the power battery form a protection loop through the resistance, and the resistance value of the resistance in the present invention may be configured to be very large to ensure that the current is small, and the nailing situation will not spark in the case of nailing abuse. While in the case of overcharge of a power battery, when the pressure inside the power battery exceeds a predetermined value, the first short circuit part and the second short circuit part act upwards, the first terminal and the second terminal of the power battery form a protection loop through the first short circuit part and the second short circuit part. Although, in this case, the first terminal and the second terminal of the power battery can also form a protection loop through the second short circuit part and the resistance, the two loops are in parallel to each other, and since the resistance value of the resistance is much greater than that of the first short circuit part, the circuit where the resistance with a greater resistance value is located can be neglected in this case, and overcharge protection of the power battery is realized by the loop formed by the first short circuit part and the second short circuit part. With the technical solution of the present invention, a separate protection loop can be formed respectively in the cases of overcharge and nailing abuses of a power battery to efficiently protect the power battery and prevent the power battery from catching fire or exploding, thereby efficiently enhancing the security property of the power battery.

BRIEF DESCRIPTION OF DRAWINGS

In order to describe the embodiments according to the present invention or the technical solutions in the prior art more clearly, the drawings to be used for describing the embodiments or the prior art will be briefly introduced below. Apparently, the drawings to be described below are some embodiments of the present invention, and a person having ordinary skill in the art can also obtain other drawings based on these drawings without doing any creative work.

DESCRIPTION OF EMBODIMENTS

In order to make objects, technical solutions and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
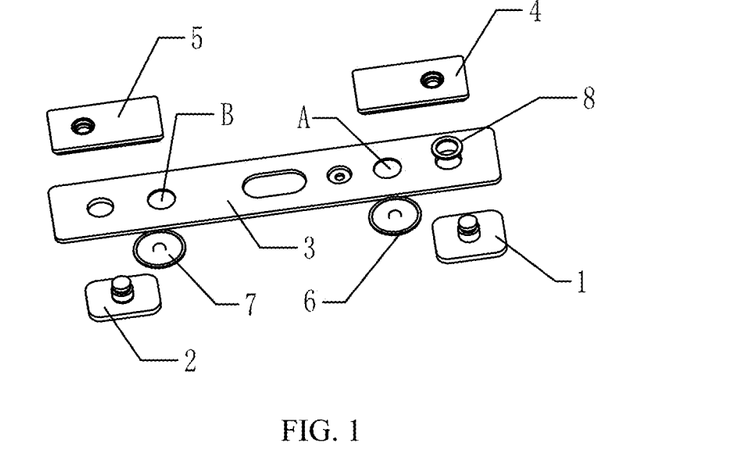
FIG. 1 illustrates the structure of an embodiment of a power battery cap structure according to the present invention.

FIG. 1 illustrates the structure of an embodiment of a power battery cap structure according to the present invention; as shown in FIG. 1, the power battery cap structure in this embodiment includes a first terminal 1, a second terminal 2 and a cap assembly; both the first terminal 1 and the second terminal 2 are provided on the cap assembly, and the second terminal is electrically insulated from the cap assembly; the power battery cap structure in this embodiment further includes a resistance 8 attached to the first terminal 1 and electrically connected the first terminal 1 with the cap assembly. Wherein, the cap assembly includes a cap sheet 3, a first short circuit part 6 and a second short circuit part 7; the first short circuit part 6 and the second short circuit part 7 are attached to the cap sheet 3 and configured to act upwards when pressure inside the power battery increases so that the first terminal 1 and the second terminal 2 are electrically connected to form a protection loop; and the first short circuit part 6 and the resistance 8 are connected in parallel when the protection loop is formed. The first terminal and the second terminal can be respectively a positive terminal or a negative terminal. Specifically, when the first terminal is a positive terminal, the second terminal is a negative terminal; when the first terminal is a negative terminal, the second terminal is a positive terminal. Preferably, the first terminal is a positive terminal, and the second terminal is a negative terminal.

For example, there are installation holes on the two ends of the cap sheet 3 for introducing the first terminal 1 and the second terminal 2, both the first terminal 1 and the second terminal 2 are installed within the installation holes of the cap sheet 3, and an insulating spacer is provided between the second terminal 2 and the cap sheet 3 to prevent the second terminal 2 from being electrically connected with the cap sheet 3. A first terminal conductive lump 4 and a second terminal conductive lump 5 are respectively provided on the first terminal 1 and the second terminal 2; specifically, the first terminal 1 and the first terminal conductive lump 4 are connected by welding or riveting or the like, and the second terminal 2 and the second terminal conductive lump 5 are connected by welding or riveting or the like, such that the first terminal 1 is electrically connected with the first terminal conductive lump 4 and the second terminal 2 is electrically connected with the second terminal conductive lump 5. The second terminal 2 cannot be electrically connected with the cap sheet 3, so an insulating part needs to be installed between the second terminal conductive lump 5 and the cap sheet 3 so that the second terminal conductive lump 5 is insulated from the cap sheet 3. The resistance 8 is provided between the first terminal conductive lump 4 and the cap sheet 3 for electrically connecting the first terminal conductive lump 4 with the cap sheet 3. For example, the resistance 8 in this embodiment may be of an annulus shape or a cylinder shape. Since the first terminal conductive lump 4 is electrically connected with the first terminal 1, when the resistance 8 is of an annulus shape, the first terminal 1 is sleeved with the resistance 8, in which case the first terminal 1 is electrically connected with the cap sheet 3 via the resistance 8. When the resistance 8 is of a cylinder shape, the resistance 8 may be embedded between the cap sheet 3 and the first terminal conductive lump 4, in which case the cap sheet 3 is electrically connected with the first terminal conductive lump 4 via the resistance 8.

Since the first terminal conductive lump 4 is electrically connected with the cap sheet 3 by the resistance 8, and the metal shell of the battery is electrically conductive with the cap sheet 3, both the first terminal conductive lump 4 and the battery shell are electrically connected with the first terminal of the battery. When the power battery suffers from nailing, no gas is generated inside the power battery, but a metallic nail will pass through the battery shell into the battery, and then the nail will be electrically connected with the second terminal 2, thus forming a protection loop between the first terminal 1 and the second terminal 2. In order to ensure that the nailing situation will not catch fire, the current of the protection loop should be small, and the resistance value of the resistance 8 needs to be very large. It should be pointed out that, for the purpose of providing a resistance 8 meeting the required resistance value, there is not limitation to the number of the resistances 8. There may be one or more resistances 8, and the specific number may be set according to actual requirements.

As shown in FIG. 1, the first short circuit part 6 is provided below a first through hole A of the cap sheet 3, and the first through hole A is provided below the first terminal conductive lump 4; the first short circuit part 6 is electrically connected with the cap sheet 3, and the first short circuit part 6 does not contact the first terminal conductive lump 4; when the pressure inside the power battery increases, the first short circuit part 6 acts upwards under the pressure inside the power battery and is able to pass through the first through hole A to be electrically connected with the first terminal conductive lump 4. The second short circuit part 7 is provided below a second through hole B of the cap sheet 3, and the second through hole B is provided below the second terminal conductive lump 5; the second short circuit part 7 is electrically connected with the cap sheet 3, and the second short circuit part 7 does not contact the second terminal conductive lump 5; when the pressure inside the power battery increases, the second short circuit part 7 acts upwards under the pressure inside the power battery and is able to pass through the second through hole B to be electrically connected with the second terminal conductive lump 5. As shown in FIG. 1, in this embodiment, the first short circuit part 6 and the first terminal conductive lump 4 are respectively located at upper and lower sides of the first through hole A and do not contact each other; the second short circuit part 7 and the second terminal conductive lump 5 are respectively located at upper and lower sides of the second through hole B and do not contact each other.

In the case of overcharge of a power battery, the electrolyte in the power battery decomposes to generate gas, and the air pressure increases. When the air pressure reaches a preset value, the first short-circuit part 6 acts upwards, passes through the first through hole A and contacts the first terminal conductive lump 4; the second short circuit part 7 acts upwards, passes through the second through hole B and contacts the second terminal conductive lump 5. And the first short circuit part 6 and the second short circuit part 7 are respectively connected with the cap sheet 3, thereby causing the first terminal 1, the first short circuit part 6, the cap sheet 3, the second short circuit part 7 and the second terminal 2 to form a protection loop.

To be specific, in order to ensure that overcharge can stop when a power battery suffers from an accident such as overcharge, it is usually required that the current of the protection loop be very large. Two loops are formed during overcharge, and the first loop is formed by the first terminal 1, the resistance 8, the cap sheet 3, the second short circuit part 7 and the second terminal 2; the second loop is formed by the first terminal 1, the first short circuit part 6, the cap sheet 3, the second short circuit 7 and the second terminal. The two loops are in parallel to each other, and the resistance of the parallel loops is smaller than the resistance value of the one with a smaller resistance among the resistance 8 and the first short-circuit part 6, thus making the resistance value of whole loop be smaller and the current of the whole loop be greater. Since the resistance value of the resistance 8 is large and the current flowing therethrough is small, the first loop where the current flows through the resistance 8 can be neglected in the case of overcharge, therefore, the protection loop in the case of overcharge may be considered to be only the second loop formed by the first terminal 1, the first short circuit part 6, the cap sheet 3, the second short circuit part 7 and the second terminal 2. The protection loop formed in this case does not pass the resistance 8, therefore, the resistance value of the resistance 8 will not affect the current in the protection loop in the case of overcharge. Accordingly, the power battery cap structure of this embodiment cannot only protect the power battery in the case of nailing abuse, but also protect the power battery in the case of overcharge abuse.

It should be noted that due to the existence of the resistance 8, the first terminal conductive lump 4 is electrically connected with the cap sheet 3, therefore, in the above technical solution of this embodiment, the insulating part may not be installed between the first terminal conductive lump 4 of the first terminal 1 and the cap sheet 3. Alternatively, in order to be symmetric to the structure of the side of the second terminal 2, the insulating part may also be installed between the first terminal conductive lump 4 and the cap sheet 3, but a hole needs to be provided on the insulating part so that the resistance 8 passes through the hole to electrically connect the first terminal conductive lump 4 with the cap sheet 3.

In the power battery cap structure of this embodiment, by providing the first short circuit part 6 at the side of the first terminal 1, providing the second short circuit part 7 at the side of the second terminal 2 and providing the resistance 8 between the first terminal 1 and the cap sheet 3, when a power battery suffers from nailing abuse, the first short circuit part 6 and the second short circuit part 7 do not function since no gas is generated inside, and the first terminal 1 and the second terminal 2 of the power battery form a protection circuit through the resistance 8; meanwhile the resistance value of the resistance 8 in this embodiment may be set to be very large to ensure that the current is small and the nailing situation will not spark in the case of nailing abuse. While in the case of overcharge of a power battery, when the pressure inside the power battery exceeds a predetermined value, the first short circuit part 6 and the second short circuit part 7 act, the first terminal 1 and the second terminal 2 of the power battery form a protection loop through the first short circuit part 6 and the second short circuit part 7. Although, in this case, the second short circuit part 7 and the resistance 8 can also form a protection loop, the two loops are in parallel to each other, and since the resistance value of the resistance 8 is much greater than that of the first short circuit part 6, the resistance 8 with a greater resistance value in the loop can be neglected in this case, and overcharge protection of the power battery is realized by the loop formed by the first short circuit part 6 and the second short circuit part 7. With the technical solution of the present invention, a separate protection loop can be formed respectively in the cases of overcharge and nailing abuses of a power battery to efficiently protect the power battery and prevent the power battery from catching fire or exploding, thereby efficiently enhancing the security property of the power battery.

Further, in the power battery cap structure in the embodiment of the present invention, the first short circuit part 6 may the same with or different from the second short circuit part 7. Moreover, the first short circuit part 6 and the second short circuit part 7 in this embodiment of the present invention may be implemented by using a deformable sheet or a piston structure.

Figure 2:
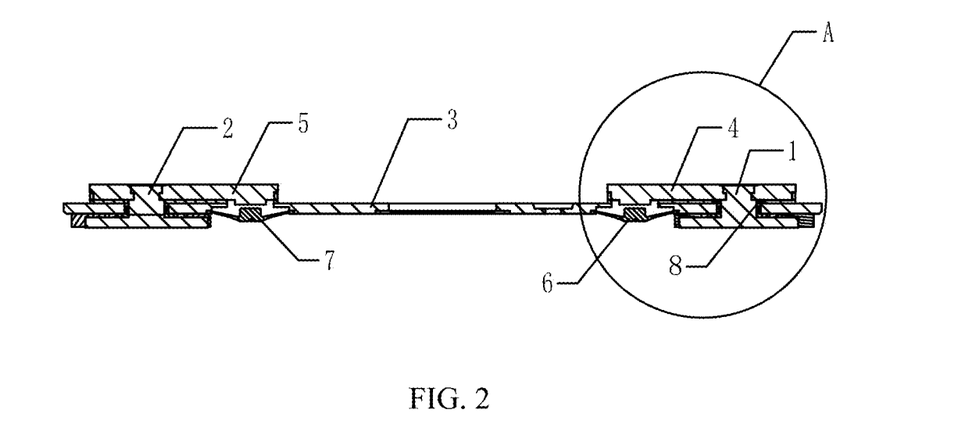
FIG. 2 illustrates the structure of another embodiment of the power battery cap structure according to the present invention.

FIG. 2 illustrates the structure of another embodiment of the power battery cap structure according to the present invention. As shown in FIG. 2, on the basis of the embodiment as shown in FIG. 1, the first short circuit part 6 and the second short circuit 7 in the power battery cap structure of this embodiment can both be implemented by using a deformable sheet.

Figure 3:
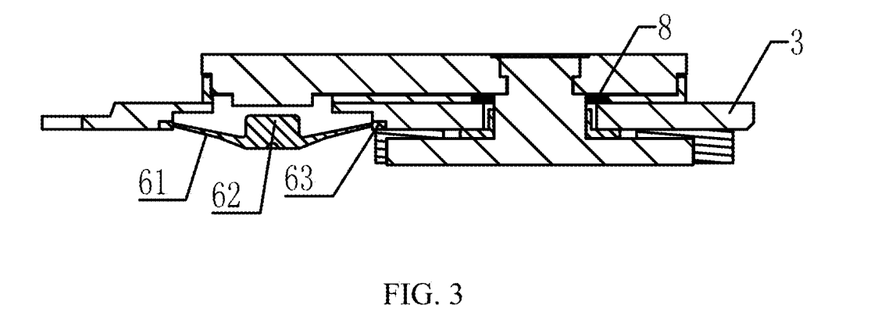
FIG. 3 is an enlarged view of an area A in FIG. 2.

FIG. 3 is an enlarged view of area A in FIG. 2. As shown in FIG. 3, FIG. 3 illustrates that the first short circuit part 6 adopts the structure of a deformable sheet, by taking one side of the first terminal in FIG. 2 as an example.

Figure 4:
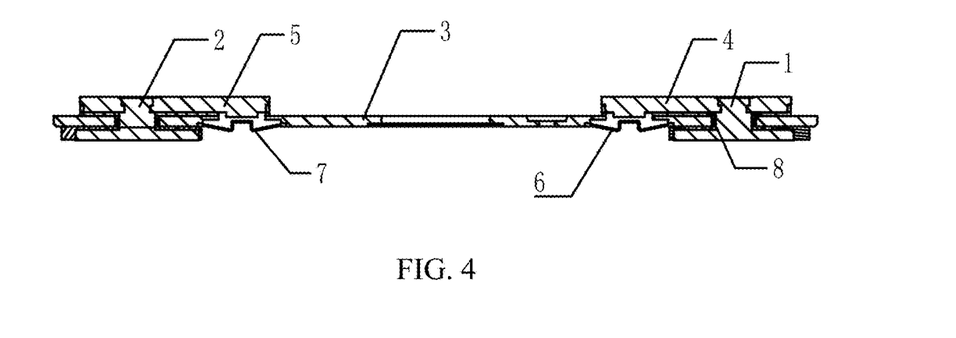
FIG. 4 illustrates the structure of still another embodiment of the power battery cap structure according to the present invention.

As shown in FIG. 3, the deformable sheet in the power battery cap structure of this embodiment includes: a soldering part 61, a protrusion part 62 and a connecting part 63 located between the soldering part 61 and the protrusion part 62, the protrusion part 62 being provided at a center position of the deformable sheet, and the soldering part 61 being provided on an outer periphery of the connecting part 63; the soldering part 61 is electrically connected with the cap sheet 3, and the protrusion part 62 does not contact the corresponding first terminal conductive lump 4. The protrusion part 62 may be configured to be solid, as shown in FIG. 2 and FIG. 3; it may also be hollow, as shown in FIG. 4. Specifically, FIG. 4 illustrates the structure of still another embodiment of the power battery cap structure according to the present invention. As shown in FIG. 4, the deformable sheet acts upwards when the pressure inside the power battery increases so that the first terminal 1 and the second terminal 2 are electrically connected. The operating principle is the same as the above embodiment, and thus will not be repeated here.

Similarly, the deformable sheet adopted by the second short circuit part 7 at the side of the second terminal 2 as shown in FIG. 2 has the same structure as the deformable sheet adopted by the first short circuit part 6 at the side of the first terminal 1, and thus no description will be made here.

As shown in FIG. 2 and FIG. 3, the protrusion part 62 in the power battery cap structure of this embodiment may be a cylinder or a column with a polygonal (e.g., square, pentagonal or hexagonal, or the like) cross section; however, with the same inner diameter, the perimeter of a circle is the longest, and with the same thickness of the protrusion part 62, the overcurrent area of a cylinder is the largest. Therefore, the protrusion part 62 of this embodiment is preferably a cylinder. Preferably, the thickness of the connecting part 63 of the power battery cap structure of this embodiment may gradually decrease in the direction from the protrusion part 62 to the soldering part 63, which can efficiently increase the overcurrent area of the inner circle of the connecting part 63, allow the sectional area of the entire connecting part 63 to meet the requirement for overcurrent from the inside out, and reduce the probability of the deformable sheet being melt off.

It should be noted that description is made for FIG. 3 by taking the protrusion part 62 pointing to the direction of the first terminal conductive lump 4 as an example. In practical applications, the protrusion part 62 may point to a direction away from the side of the first terminal conductive lump 4, or a plate may be soldered at the protrusion part. Reference may be made to the above related disclosure for the principle and effect, which will not be repeated here.

By adopting the above deformable sheet and incorporating the resistance 8 to enable the power battery to respectively form separate protection loops in the cases of overcharge and nailing abuses, the first short circuit part 6 and the second short circuit part 7 in the power battery cap structure of this embodiment efficiently protect the power battery, prevent the power battery from catching fire or exploding, thereby efficiently enhancing the security property of the power battery.

Figure 5:
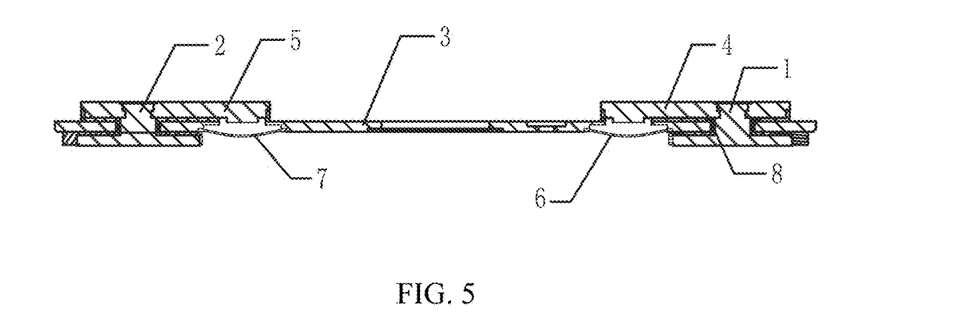
FIG. 5 illustrates the structure of still another embodiment of the power battery cap structure according to the present invention.

FIG. 5 illustrates the structure of still another embodiment of the power battery cap structure according to the present invention. As shown in FIG. 5, on the basis of the embodiment as shown in FIG. 1, the first short circuit part 6 and the second short circuit 7 in the power battery cap structure of this embodiment can both be implemented by using a deformable sheet. The power battery cap structure of this embodiment differs from the power battery cap structure in the embodiment as shown in FIG. 4 in that the deformable sheet in the power battery cap structure of this embodiment is configured to be bent to project away from the cap assembly, i.e., its cross section has an arc shape, and the periphery of the deformable sheet is electrically connected with the cap sheet 3. When the pressure inside the power battery increases, the deformable sheet acts upwards, i.e., turns upwards, at which moment the deformable sheet is bent to project close to the cap assembly, and finally the arc bottom of the deformable sheet contacts the corresponding conductive lump, thereby causing the first terminal 1 and the second terminal 2 to be electrically connected to form a protection loop. The principle and effect of the deformable sheet in the power battery cap structure of this embodiment are the same as those in the embodiment as shown in FIG. 2 and thus will not be repeated here.

It should be noted that in order to increase the contact area of the deformable sheet with the corresponding conductive lump, the contact area of each conductive lump with the deformable sheet may be configured to be arc or the arc bottom of the deformable sheet may be configured to be a flat bottom.

It should be noted that the deformable sheet in each of the above embodiment is only an example for describing the power battery cap structure of the present invention, and no limitation is made to the structure of the deformable sheet defined in the claims of the present invention. For example, the thickness of the connecting part 63 in the deformable sheet as shown in FIG. 3 may be even, or the periphery of the deformable sheet as shown in FIG. 4 and FIG. 5 may be round, square or polygonal or the like, which will not be repeated here.

Figure 6:
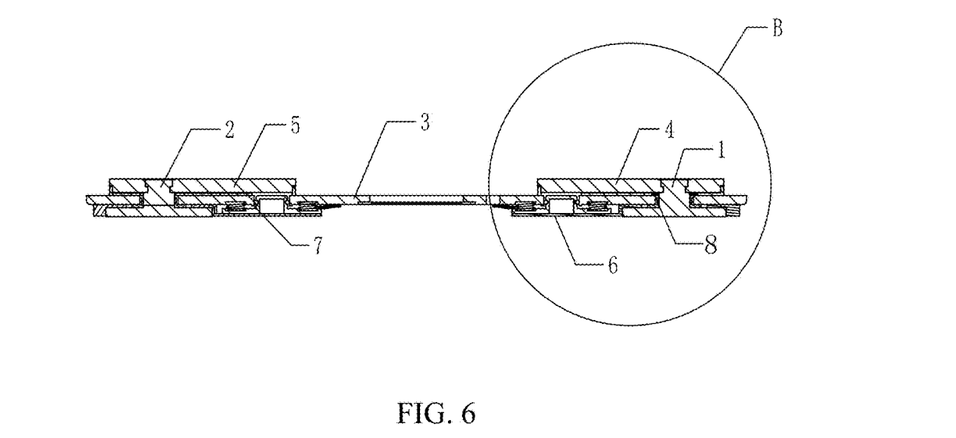
FIG. 6 illustrates the structure of still another embodiment of the power battery cap structure according to the present invention.

FIG. 6 illustrates the structure of still another embodiment of the power battery cap structure according to the present invention. As shown in FIG. 6, on the basis of the embodiment as shown in FIG. 1, the first short circuit part 6 and the second short circuit 7 in the power battery cap structure of this embodiment can both be implemented by a piston structure.

Figure 7:
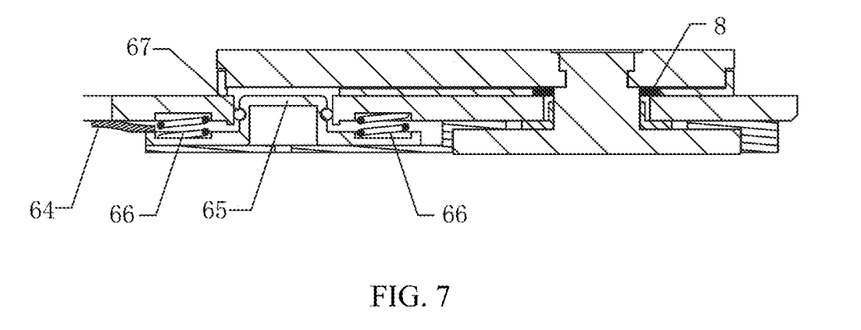
FIG. 7 is an enlarged view of an area B in FIG. 6.

FIG. 7 is an enlarged view of area B in FIG. 6. As shown in FIG. 7, FIG. 7 describes the piston structure adopted by the first short circuit part 6 by taking the side of the first terminal in FIG. 6 as an example. As shown in FIG. 7, the piston structure in the power battery cap structure in this embodiment includes: a conductive sheet 64, a piston 65 and two springs 66; the piston 65 does not contact the corresponding first terminal conductive lump 4. The two springs 66 are provided respectively at two sides of the piston 65. For example, the piston 65 is protrusion-shaped, the springs 66 are provided on the two sides of the convex part of the piston 65, and the top of the spring 66 contacts the cap sheet 3. When the power battery is in normal use, the piston 65 may be prevented from contacting the corresponding first terminal conductive lump 4 due to the elastic force of the springs 66. One end of the conductive sheet 64 is electrically connected with the cap sheet 3 while the other end is electrically connected with the piston 65, thereby causing the piston 65 to be electrically connected with the cap sheet 3; the piston 65 acts upwards to contact the first terminal conductive lump 4 when the pressure inside the power battery increases to exceed the elastic force of the springs 66 so that the first terminal 1 and the second terminal 2 are electrically connected to form a protection loop.

Similarly, the piston structure adopted by the second short circuit part 7 at the side of the second terminal 2 as shown in FIG. 6 is the same structure with that adopted by the first short circuit part 6 at the side of the first terminal 1, and thus no description will be made here.

Furthermore, in the power battery cap structure in the above embodiment, the piston structure further includes a sealing ring 67 which is provided between the piston 65 and the cap sheet 3 for sealing the gap between the piston 65 and the cap sheet 3. Since the piston 65 is connected with the springs 66, the sealing of the first through hole A and the second through hole B cannot be guaranteed. Accordingly, use of the sealing ring 67 ensures that the electrolyte of the power battery will not leak from the first though hole A or through hole B.

By adopting the above deformable sheet and incorporating the resistance 8 to enable the power battery to respectively form separate protection loops in the cases of overcharge and nailing abuses, the first short circuit part 6 and the second short circuit part 7 in the power battery cap structure of this embodiment efficiently protect the power battery, prevent the power battery from catching fire or exploding, thereby efficiently enhancing the security property of the power battery.

Furthermore, the piston structure adopted in the power battery cap structure of the above embodiment is only one of the piston structures, and no limitation is made to other piston structure with a similar function for the implementation of the technical solution of the present invention.

Figure 8:
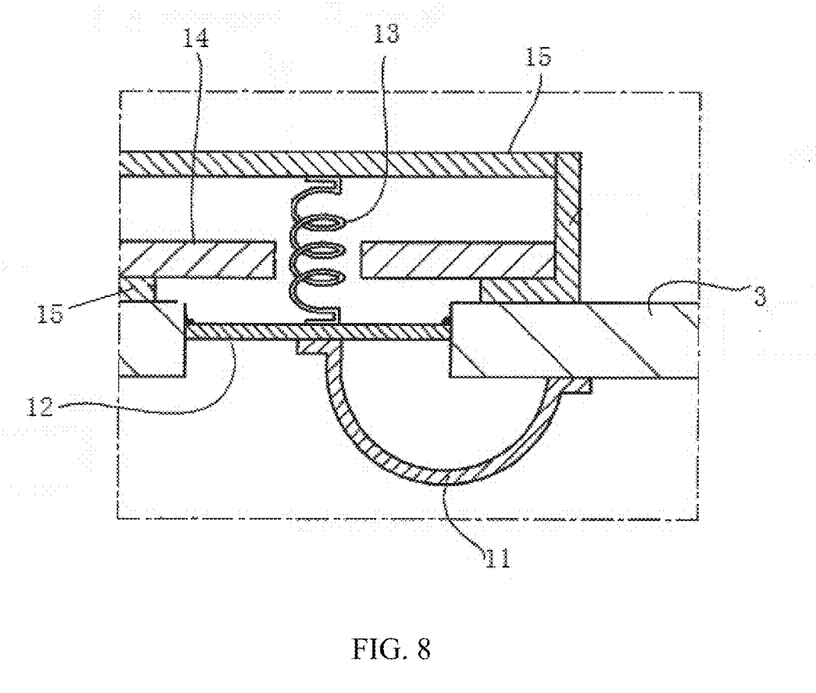
FIG. 8 illustrates the structure of another piston used by a first short circuit part 6 and a second short circuit part 7 according to an embodiment of the present invention.

For example, FIG. 8 illustrates the structure of another piston used by a first short circuit part 6 and a second short circuit part 7 according to an embodiment of the present invention. As shown in FIG. 8, the piston structure in the power battery may include, from inside to outside, a stretch sheet 11, a displacement plate 12, a spring 13, an outer conductive sheet 14 and a separation board 15. The stretch sheet 11 is respectively electrically connected with the cap sheet 3 and the displacement plate 12; the spring 13 is provided on the upper end of the displacement plate 12 and passes through the outer conductive sheet 14 to be connected with the separation board 15 to prevent the displacement plate 12 from being electrically connected with the outer conductive sheet 14 provided on the first terminal 1 or the second terminal 2; the outer conductive sheet 14 is electrically connected with the first terminal 1 or the second terminal 2, and is insulatedly connected with the cap sheet 3 through the separation board 15; the shape of the cross section of the separation board 15 may be a square with a notch, one end of the spring 13 passes through the notch to be connected with the displacement plate 12 while the other end is connected with the separation board 15 opposite to the notch. When both of the first short circuit part 6 and the second short circuit part 7 in the power battery cap structure adopt the above piston structure, the displacement plate 12 acts upwards when the pressure inside the power battery increases to exceed the elastic force of the spring 13 to be electrically connected with the outer conductive sheet 14 so as to be electrically connected with the corresponding terminal, thereby allowing the first terminal 1 to be electrically connected with the second terminal 2, thus forming a protection loop.

The piston structure of this embodiment may be applied to the first short circuit part 6 or the second short circuit part 7 in the power battery cap structure in any embodiment in FIGS. 2-6 to form the optional embodiment of the power batter cap structure of the present invention. Its implementation principle is similar to that of the embodiment shown in FIG. 6, and reference may be made to the content recorded in the above embodiment for the details, and no further description will be made here.

Alternatively, the first short circuit part 6 and the second short circuit part 7 of this embodiment may also adopt a conductive stretchable part such as a threaded tube directly provided on the cap sheet 3, a conductive cross-bar is provided on each terminal, and the conductive stretchable part does not contact the conductive cross-bar. When the pressure inside the power battery increases, the conductive stretchable part can act upwards to be electrically connected with the conductive cross-bar, thereby causing the first terminal 1 to be electrically connected with the second terminal 2.

It should be noted that the piston structure adopted by the first short circuit part 6 and the second short circuit part 7 in each of the above embodiment is only an exemplary structure for describing the power battery cap structure according to the present invention, and no limitation is made to the piston structure as defined in the claims of the present invention.

It should be noted that in any of the above embodiment, the technical solution of the present invention is described by taking the first short circuit part 6 and the second short circuit part 7 having the same structure as an example, but in practical applications, the first short circuit part 6 and the second short circuit part 7 may have different structures, for example, the first short circuit part 6 adopts a deformable sheet while the second short circuit part 7 adopts a piston structure, or the first short circuit part 6 adopts a piston structure while the second short circuit part 7 adopts a deformable sheet, or the like, which will not be described one by one. However, the short circuit part 6 and the second short circuit part 7 need to have the same pressure threshold for their actions so as to ensure that the first short circuit part 6 and the second short circuit part 7 act simultaneously when the power battery suffers from abuses.

Figure 9:
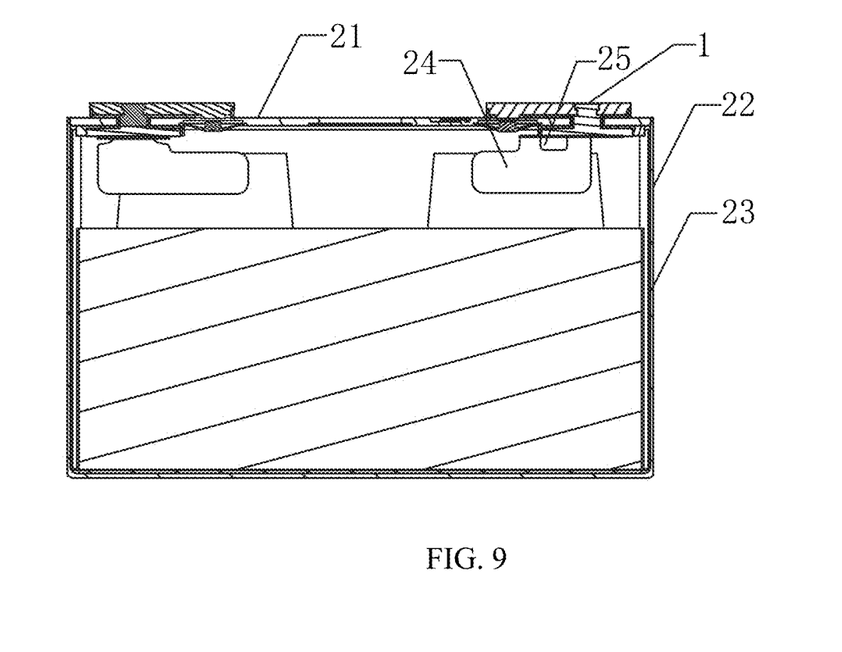
FIG. 9 illustrates the structure of an embodiment of a power battery according to the present invention.

FIG. 9 illustrates the structure of an embodiment of the power battery according to the present invention. The power battery in this embodiment includes a power battery cap structure 21, a battery shell 22 and an insulating sheet 23, etc., wherein, the connection relationships between various components will not be repeated here, and reference for them may be made to the related prior art. Wherein, the power battery cap structure 21 may adopt the power battery cap structures of the embodiments as shown in the aforesaid FIGS. 1-8. Reference may be made to the above embodiments for more details, which will not be repeated here.

Furthermore, the power battery of this embodiment further includes a first electrode tab and a connecting part 24 for electrically connecting the first electrode tab with the first terminal 1, and aperture 25 provided on the connecting part 24. Wherein, the connecting part 24 is a fuse which can instantly melt off when a large current flows by so as to cut off the loop. The aperture 25 on the connecting part 24 is intended to reduce the overcurrent area of the connecting part 24 and the first terminal so that the connecting part 24 can be melt off more easily when the current is very large.

The purpose of mounting the power battery cap structure 21 is to enable the first terminal 1 and the second terminal 2 to short circuit to generate an external current in the cases of nailing or overcharge of the power battery, thus forming a protection loop and reducing the risk of nailing or overcharge. However, the current of the protection loop cannot be enlarged infinitely, since the power battery cap structure 21 will burn when the current is very large. Therefore, in order to avoid this circumstance, aperture 25 may be provided on the connecting part 24 for electrically connecting the first terminal 1 with the first electrode tab. In the case of overcharge, a large external current will melt off the connecting part 24, and it can be ensured by providing aperture 25 that the connecting part 24 is melt off before the external current burns the power battery cap structure 21 to cut off the charging loop so that the input power supply stops charging the power battery, thus protecting the power battery cap structure 21 from burning off. It should be noted that the power battery of this invention may further includes other parts, and reference for them may be made to the related prior art, which will not be repeated here.

In the power battery of this embodiment, by using the above power battery cap structure, a separate protection loop can be formed respectively in the cases of overcharge and nailing abuses of a power battery to efficiently protect the power battery and prevent the power battery from catching fire or exploding, thereby efficiently enhancing the security property of the power battery.

Finally, it should be noted that all of the above embodiments are only used to describe, rather than limit, the technical solution of the present invention; although the present invention has been described in detail with reference to each of the aforesaid embodiments, a person having ordinary skilled in the art should appreciate that modifications may be made to the technical solution recorded in each embodiment, or substitutions may be made to part or all of the technical features therein; and these modifications or substitutions will not cause the essence of the corresponding technical solution to depart from the scope of the technical solution of each embodiment of the present invention.

What is claimed is:

1. A power battery cap structure, comprising a first terminal, a second terminal and a cap assembly, the second terminal being electrically insulated from the cap assembly,
    wherein the power battery cap structure further comprises a resistance, the resistance electrically connects the first terminal with the cap assembly when an internal pressure of the power battery does not exceed a predetermined threshold, the cap assembly comprises a cap sheet, a first short circuit part and a second short circuit part;
    the first short circuit part and the second short circuit part are attached to the cap sheet, when the internal pressure of the power battery exceeds the predetermined threshold, the first short circuit part and the second short circuit part act and then form a first circuit path and a second circuit path between the first terminal and the second terminal; the first circuit path passes through the first terminal, the second short circuit part, the resistance and the second terminal; and the second circuit path passes through the first terminal, the first short circuit part, the second short circuit part and the second terminal; and a resistance value of the resistance is larger than a resistance value of the first short circuit part.

2. The power battery cap structure according to claim 1, wherein the first circuit path comprises the first terminal, the resistance, the cap sheet, the second short circuit part and the second terminal which are in series; the second circuit path comprises the first terminal, the first short circuit part, the cap sheet, the second short circuit part and the second terminal which are in series.

3. The power battery cap structure according to claim 2, wherein the first circuit path comprises the first terminal, the resistance, the cap sheet, the second short circuit part and the second terminal which are in series successively; the second circuit path comprises the first terminal, the first short circuit part, the cap sheet, the second short circuit part and the second terminal which are in series successively.

4. The power battery cap structure according to claim 1, wherein further comprising a first terminal conductive lump, the first terminal conductive lump is electrically connected with the first terminal, the resistance is arranged between the first terminal conductive lump and the cap sheet;

the first circuit path comprises the first terminal, the first terminal conductive lump, the resistance, the cap sheet, the second short circuit part and the second terminal which are in series; the second circuit path comprises the first terminal, the first terminal conductive lump, the first short circuit part, the cap sheet, the second short circuit part and the second terminal which are in series.

5. The power battery cap structure according to claim 4, wherein the first circuit path comprises the first terminal, the first terminal conductive lump, the resistance, the cap sheet, the second short circuit part and the second terminal which are in series successively; the second circuit path comprises the first terminal, the first terminal conductive lump, the first short circuit part, the cap sheet, the second short circuit part and the second terminal which are in series successively.

6. The power battery cap structure according to claim 1, wherein the power battery cap structure further comprises a first terminal conductive lump, the first terminal conductive lump is electrically connected with the first terminal, the resistance is arranged between the first terminal conductive lump and the cap sheet;

the power battery cap structure further comprises a second terminal conductive lump, the second terminal conductive lump is electrically connected with the second terminal;

the first short circuit part is electrically connected with the cap sheet, and when the internal pressure of the power battery does not exceed the predetermined threshold, the first short circuit part is insulated from the first terminal conductive lump; when the internal pressure of the power battery exceeds the predetermined threshold, the first short circuit part acts to be electrically connected with the first terminal conductive lump;

the second short circuit part is electrically connected with the cap sheet, and when the internal pressure of the power battery does not exceed the predetermined threshold, the second short circuit part is insulated from the second terminal conductive lump; when the internal pressure of the power battery exceeds the predetermined threshold, the second short circuit part acts to be electrically connected with the second terminal conductive lump.

7. The power battery cap structure according to claim 6, wherein the cap sheet is provided with a second through hole, the second through hole is provided below the second terminal conductive lump, the second short circuit part is arranged below the second through hole; when the internal pressure of the power battery exceeds the predetermined threshold, the second short circuit part acts upward, and the second short circuit part goes through the second through hole so as to be electrically connected with the second terminal conductive lump.

8. The power battery cap structure according to claim 4, wherein the cap sheet is provided with a first through hole, the first through hole is provided below the first terminal conductive lump, the first short circuit part is arranged below the first through hole; when the internal pressure of the power battery exceeds the predetermined threshold, the first short circuit part acts upward, and the first short circuit part goes through the first through hole so as to be electrically connected with the first terminal conductive lump.

9. The power battery cap structure according to claim 1, wherein both the first short circuit part and the second short circuit part adopt a deformable sheet, the deformable sheet comprises: a soldering part, a protrusion part and a connecting part located between the soldering part and the protrusion part, the protrusion part being provided at a center position of the deformable sheet, and the soldering part being provided on an outer periphery of the connecting part; the soldering part is electrically connected with the cap sheet, when the internal pressure of the power battery exceeds the predetermined threshold, the deformable sheet acts so that the first terminal and the second terminal are electrically connected.

10. The power battery cap structure according to claim 9, wherein a thickness of the connecting part gradually decreases in a direction from the protrusion part to the soldering part.

11. The power battery cap structure according to claim 9, wherein the protrusion is shaped as a cylinder.

12. The power battery cap structure according to claim 1, wherein both the first short circuit part and the second short circuit part adopt a deformable sheet, the deformable sheet is configured to be bent to project away from the cap assembly; the periphery of the deformable sheet is electrically connected with the cap sheet, when the internal pressure of the power battery exceeds the predetermined threshold, the deformable sheet acts so that the first terminal and the second terminal are electrically connected.

13. A power battery, wherein a cap structure of the power battery utilizes the power battery cap structure as described in claim 1.

14. The power battery according to claim 13, wherein the power battery comprises a first electrode tab and a connecting part for electrically connecting the first electrode tab with the first terminal, and an aperture provided on the connecting part.

* * * * *